United States Patent
Terwilliger et al.

(10) Patent No.: US 11,927,132 B1
(45) Date of Patent: Mar. 12, 2024

(54) WATER SEPARATOR FOR HYDROGEN STEAM INJECTED TURBINE ENGINE

(71) Applicant: Raytheon Technologies Corporation, Farmington, CT (US)

(72) Inventors: Neil J. Terwilliger, Cheshire, CT (US); Abbas A. Alahyari, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/108,298

(22) Filed: Feb. 10, 2023

(51) Int. Cl.
*F02C 6/18* (2006.01)

(52) U.S. Cl.
CPC .......... *F02C 6/18* (2013.01); *F05D 2240/123* (2013.01)

(58) Field of Classification Search
CPC .............................. F02C 6/18; F05D 2240/123
See application file for complete search history.

(56) References Cited

U.S. PATENT DOCUMENTS

| | | | | |
|---|---|---|---|---|
| 2,498,979 A | * | 2/1950 | Bourne | F01N 3/04 181/260 |
| 3,799,249 A | * | 3/1974 | Linhardt | F17C 9/02 261/153 |
| 7,422,415 B2 | * | 9/2008 | Burdgick | F01D 5/186 415/169.1 |
| 7,442,415 B2 | | 9/2008 | Burdgick et al. | |
| 8,430,360 B2 | * | 4/2013 | Schwarze | F02C 9/40 244/135 C |
| 8,568,090 B2 | | 10/2013 | Guo et al. | |
| 10,132,178 B2 | | 11/2018 | Ishibashi et al. | |
| 2010/0329853 A1 | | 12/2010 | Guo et al. | |
| 2021/0207500 A1 | * | 7/2021 | Klingels | F01K 23/10 |

* cited by examiner

*Primary Examiner* — Lorne E Meade
(74) *Attorney, Agent, or Firm* — Carlson, Gaskey & Olds, P.C.

(57) ABSTRACT

A propulsion system for an aircraft includes a core engine that includes a core flow path where air is compressed in a compressor section, communicated to a combustor section, mixed with a hydrogen based fuel and ignited to generate a core gas flow that is expanded through a turbine section. The propulsion system includes a hydrogen fuel system that is configured to supply hydrogen fuel to the combustor through a fuel flow path, a condenser that is arranged along the core flow path and configured to condense water within the core gas flow, and a separator that includes an inlet, a primary water outlet and an exit that includes a plurality of exit guide vanes for straightening the core gas flow that proceeds through the exit. The exit guide vanes include a secondary water outlet for removing condensed water in the core gas flow that proceeds through the exit.

20 Claims, 6 Drawing Sheets

WATER SEPARATOR FOR HYDROGEN STEAM INJECTED TURBINE ENGINE

STATEMENT REGARDING FEDERALLY SPONSORED RESEARCH OR DEVELOPMENT

This invention was made with Government support under Contract No.: DE-AR0001561 awarded by the United States Department of Energy, Office of ARPA-E. The Government has certain rights in this invention.

TECHNICAL FIELD

The present disclosure relates generally to a hydrogen powered aircraft propulsion system and, more particularly to water separator for separating liquid from an exhaust gas flow.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to atmosphere. The lost heat reduces the overall efficiency of the engine.

Turbine engine manufacturers continue to seek further improvements to engine performance including improvements to reduce environmental impact while improving propulsive efficiencies.

SUMMARY

A propulsion system for an aircraft according to an exemplary embodiment of this disclosure, among other possible things includes a core engine that includes a core flow path where air is compressed in a compressor section, communicated to a combustor section, mixed with a hydrogen based fuel and ignited to generate a core gas flow that is expanded through a turbine section. The propulsion system includes a hydrogen fuel system that is configured to supply hydrogen fuel to the combustor through a fuel flow path, a condenser that is arranged along the core flow path and configured to condense water within the core gas flow, and a water separator that includes an inlet, a primary water outlet and an exit that includes a plurality of exit guide vanes for straightening the core gas flow that proceeds through the exit. The exit guide vanes include a secondary water outlet for removing condensed water in the core gas flow that proceeds through the exit.

In a further embodiment of the foregoing, each of the plurality of exit guide vanes include a channel that is in communication with the secondary water outlet for routing the condensed water to a water reservoir.

In a further embodiment of any of the foregoing, each of the exit guide vanes includes a root portion that is disposed proximate a central axis of the water separator and a tip portion is disposed at a periphery of the water separator and the channel includes an outlet that is disposed proximate the periphery.

In a further embodiment of any of the foregoing, the propulsion system includes a water storage tank and the channel is configured to communicate water that is recovered through the primary water outlet and the secondary water outlet to the water storage tank.

In a further embodiment of any of the foregoing, the secondary water outlet includes a plurality of openings.

In a further embodiment of any of the foregoing, the secondary water outlet includes at least one slot.

In a further embodiment of any of the foregoing, the secondary water outlet includes a porous region on a surface of at least one of the exit guide vanes.

In a further embodiment of any of the foregoing, each of the exit guide vanes includes a pressure side and a suction side with the secondary water outlet that is disposed on the pressure side.

In a further embodiment of any of the foregoing, the propulsion system includes an evaporator that is arranged along the core flow path and is configured to receive a portion of the water that is extracted by the condenser to generate a steam flow. The steam flow is injected into the core flow path upstream of the turbine section.

A water recovery system according to another exemplary embodiment of this disclosure, among other possible things includes a separator that includes an inlet, a primary water outlet and an exit that includes a plurality of exit guide vanes for straightening a core flow that proceeds through the exit. The exit guide vanes include a secondary water outlet for removing condensed water in the core flow that proceeds through the exit.

In a further embodiment of the foregoing, the water recovery system further includes a condenser that is arranged to condense water present within the core flow.

In a further embodiment of any of the foregoing, each of the plurality of exit guide vanes include a channel that is in communication with the secondary water outlet for routing the condensed water to a water reservoir.

In a further embodiment of any of the foregoing, each of the exit guide vanes includes a root portion that is disposed proximate a central axis of the separator and a tip portion that is disposed at a periphery of the separator and the channel includes an outlet that is disposed proximate the periphery.

In a further embodiment of any of the foregoing, the secondary water outlet includes a plurality of holes.

In a further embodiment of any of the foregoing, the secondary water outlet includes at least one slot.

In a further embodiment of any of the foregoing, the secondary water outlet includes a porous region on a surface of at least one exit guide vane.

In a further embodiment of any of the foregoing, each of the exit guide vanes includes a pressure side and a suction side with the secondary water outlet that is disposed on the pressure side.

A method of operating an aircraft propulsion system according to another exemplary embodiment of this disclosure, among other possible things includes generating a core gas flow that includes water, condensing water within the core gas flow into a liquid in a condenser, separating the liquid water from the core gas flow by inducing a circumferential flow through a circular housing to expel the liquid water through a primary water outlet, straightening the core flow through an exit guide vane assembly, and separating liquid water from the core gas flow through a secondary water outlet that is disposed within at least some guide vanes of the exit guide vane assembly.

In a further embodiment of the foregoing, the secondary water outlet includes openings on a pressure side of the guide vanes and further include directing the core gas flow against the pressure side of the guide vanes.

In a further embodiment of any of the foregoing, the method further includes generating a propulsive thrust with the core gas flow that proceeds through the exit guide vane assembly.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
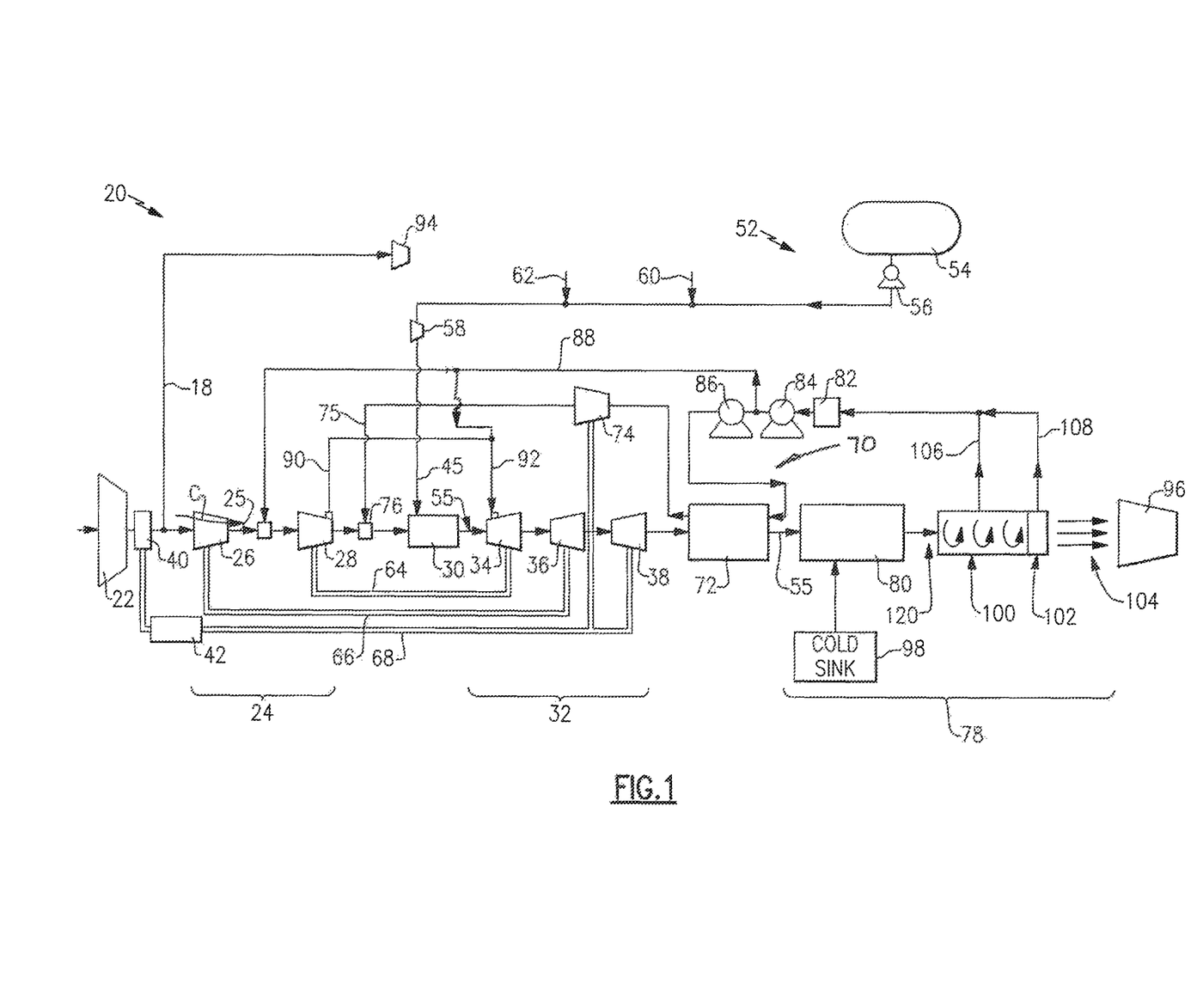
FIG. 1 is a schematic view of an example propulsion system with a water recover system.

FIG. 1 schematically illustrates an aircraft propulsion system in the form of an example hydrogen steam injected inter-cooled turbine engine system that is generally indicated at 20. The system 20 includes a water recovery system 78 with a separator 100 that separates liquid water from a core flow 120 in an exit guide vane assembly 102.

The engine 20 includes a core engine with a core airflow path C through a fan 22, a compressor section 24, a combustor 30 and a turbine section 32. The fan 22 drives inlet air as a core flow 25 into the compressor section 24. In the compressor section 24, the core flow 25 is compressed and communicated to a combustor 30. In the combustor 30, the core flow 25 is mixed with a hydrogen ($H_2$) fuel flow 45 and ignited to generate a high energy gas flow 55 that expands through the turbine section 32 where energy is extracted and utilized to drive the fan 22 and the compressor section 24. A bypass flow 18 may flow through the fan 22, bypass the remaining components of the engine 20, and exit through a fan nozzle 94. The high energy gas flow 55 is exhausted from the turbine section 32 and communicated to a steam generation system 70 and the water recovery system 78 before being exhausted through a core nozzle 96.

The engine 20 is configured to burn hydrogen provided by a fuel system 52. The fuel system 52 includes a liquid hydrogen ($LH_2$) tank 54 in communication with at least one pump 56. The pump 56 drives a fuel flow 45 to the combustor 30. $LH_2$ provides a thermal heat sink that can be utilized to cool various heat loads within the aircraft indicated at 60 and in the engine as indicated at 62. The heat loads may include, for example and without limitation, super conducting electrics, a working fluid of an environmental control system of the aircraft, an air conditioning heat exchanger, and engine working fluid heat exchangers. Heat accepted into the hydrogen fuel flow increase the overall fuel temperature prior to injection into the combustor 30.

A hydrogen expansion turbine 58 may be provided to reduce the pressure of the $LH_2$ fuel flow through expansion prior to communication to the combustor 30. Expansion in the expansion turbine 58 provides for the temperatures and pressures of the fuel flow to enter the combustor 30 as a gas and not a liquid.

The steam generation system 70 uses the exhaust heat to generate a steam flow by evaporating high pressure water through an evaporator 72. The generated steam may then be injected into compressed core airflow at a location 76 for communication into the combustor 30 to improve performance by increasing turbine mass flow and power output without additional work required by the compressor section. In one example embodiment the location 76 is upstream of the combustor 30. Steam flow from the evaporator 72 may drive a steam turbine 74 to provide an additional work output prior to injection into the combustor 30.

The water recovery system 78 draws water, schematically indicated at 106, 108, from the high energy gas flow 55 and communicates the recovered water to water storage tank 82. The water storage tank 82 operates as an accumulator to provide sufficient water for operation during various engine operating conditions. A condenser 80 and a separator 100 are provided downstream of the turbine section 32 and the evaporator 72. The condenser 80 is in communication with a cold sink, schematically indicated at 98. The cold sink 98 may be, for example, ram or fan air depending on the application and/or engine configuration.

The engine 20 has an increased power output from the injected steam due to an increasing mass flow through the turbine section 32 without a corresponding increase in work from the compressor section 24. An example engine operation cycle may include up to (or more than) 35% steam-air-ratios (SAR) and may be assisted by a multiple fold (e.g., 2×, 3×, etc.) increase in moisture from burning $H_2$ as the fuel. In some embodiments, the SAR may be within a range of 30-75%. In at least one example, the SAR may be 70%. In some embodiments, an amount of water injected prior to combustion may include 0.1 to 1 unit of water per 1 unit of air.

The water recovery system 78 includes the water storage tank 82 that receives water from the condenser/water separator 80 and provides for the accumulation of a volume of water required for production of sufficient amounts of steam. Water recovered from the exhaust gas flow is driven by a low pressure pump 84 and a high pressure pump 86 to the evaporator 72.

A water intercooling flow 88 may be communicated to the compressor section 24 to reduce a temperature of the core airflow 25 and increase mass flow. Reduced temperatures and increased mass flow provided by injection of water increases compressor efficiency. Water may also be used as a cooling flow 92 to cool cooling air flow 90 communicated from the compressor section 24 to the turbine section 32.

The example compressor section 24 includes a low pressure compressor (LPC) 26 and a high pressure compressor (HPC) 28. The turbine section 32 includes a high pressure turbine (HPT) 34, an intermediate pressure turbine (IPT) 36, and a low pressure turbine (LPT) 38. The turbines 34, 36 and 38 are coupled to a corresponding compressor section. In this disclosed example, the high pressure turbine is coupled by a high shaft 64 to drive the high pressure compressor 28. An intermediate shaft 66 couples the intermediate turbine 36 to the low pressure compressor 26.

A low shaft 68 is coupled to the low pressure turbine 38 and a gearbox 40 to drive the fan 22. The low shaft 68 may further be coupled to an electric machine 42 that is configured to impart and/or extract power into the low shaft 68. The example gearbox 40 is an epicyclical gear train, such as a planetary gear system, star gear system or other known gear system, with a gear reduction ratio of greater than about 2.3.

The separator 100 includes an exit guide vane assembly 102 that straightens the gas flow 120 to provide a thrust producing straight core flow 104 that is communicated through the nozzle 96. An incoming water containing core gas flow 120 is swirled in the separators 100 such that water is propelled radially outward through a primary water outlet to generate a primary water flow 106. The example exit guide vane assembly 102 includes a secondary water outlet to remove an additional amount of liquid water from the core flow 120. The secondary water outlet provides a secondary water flow 108 to the water tank 86.

Although the example engine 20 is described and shown by way of example as a three spool engine, other engine configurations, such as two-spool may also benefit from this disclosure and are within the contemplation and scope of this disclosure.

Figure 2:
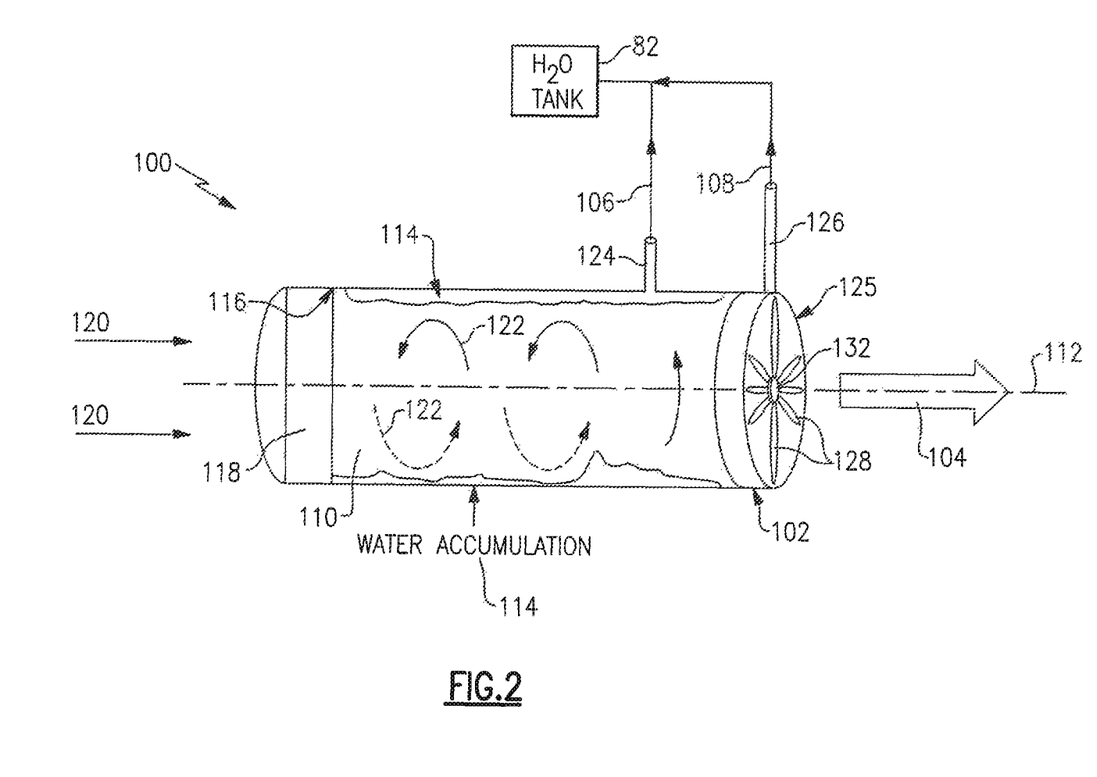
FIG. 2 is a schematic view of an example separator.

Referring to FIG. 2, with continued reference to FIG. 1, the example separator 100 is schematically shown. The separator 100 includes a swirl inducing section 118 that introduces a swirl flow component into the liquid water containing core flow 120 as it proceeds along a central axis 112 into chamber 110. The incoming core flow 120 has already been through the condenser 80 where water has been condensed and is present in a liquid form. Although a swirl inducing section 118 is shown as part of the separator 100, it may be a separate structure such that the incoming flow 120 already includes a swirling flow component.

The swirling core flow shown schematically at 122, propels the heavier liquid radially outward through a primary water outlet 124. Accumulated water schematically indicated at 114 is exhausted as the primary flow 106 and is directed to the tank 82.

The remaining gas portion of the core flow 122 is directed through an exit guide vane assembly 102 disposed at an exit 125 of the chamber 110. The guide vane assembly 102 includes a plurality of vanes 128 disposed about a central hub 132. The vanes 128 are configured to straighten the flow 122 to generate an axial flow 104 that may generate a propulsive thrust. At least some of the vanes 128 includes openings for water flow that is communicated through a secondary water outlet 126.

Not all of the liquid water may be driven to the radially outer walls of the chamber 110. Some liquid water will remain in the flow as it impacts the vanes 128. The vanes 128 provide for the separation of an additional amount of water recovery to accommodate the demands of the steam injection and intercooling systems.

Figure 3:
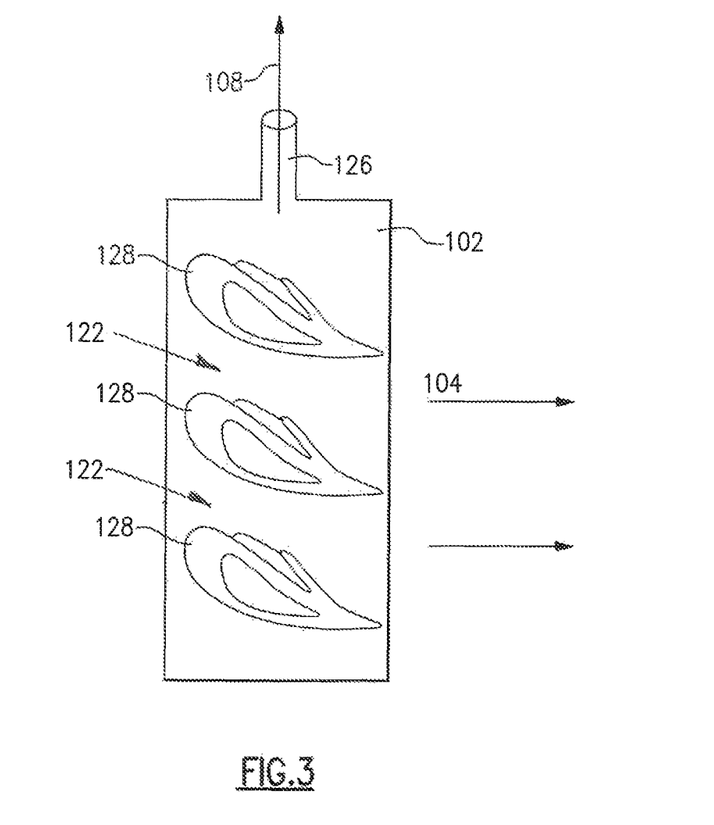
FIG. 3 is a schematic view of an example exit guide vane assembly.

Referring to FIG. 3 with continued reference to FIG. 2, the example exit guide vane assembly 102 is shown schematically with vanes 128 that provide a secondary water outlet 126 for a secondary water flow 108. The vanes 128 are arranged to remove the swirl component of incoming flow 122 and generate the straight axial flow 104 that is communicated through the nozzle 96 and contributes propulsive thrust.

Figure 4:
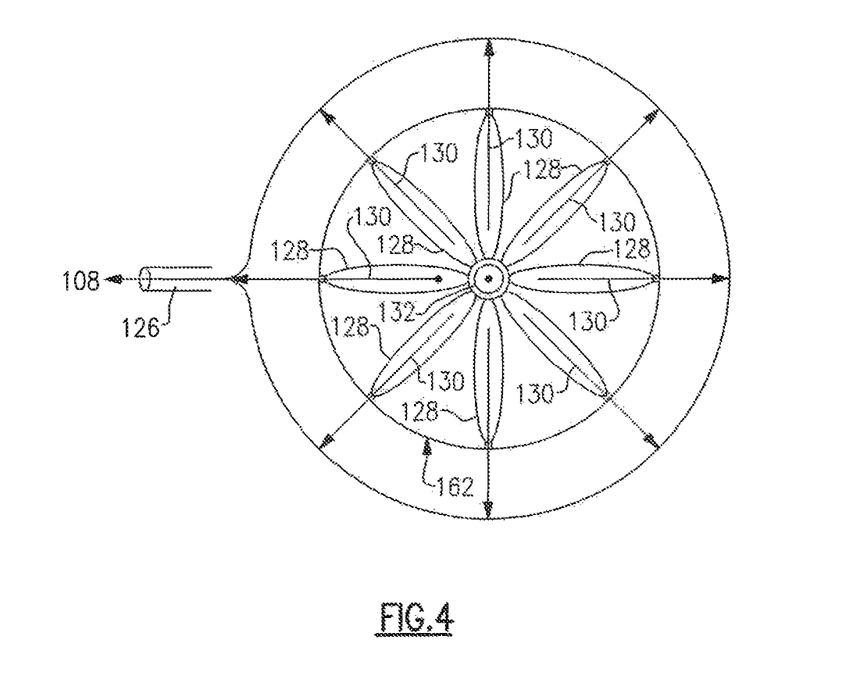
FIG. 4 is a front schematic view of the example guide vane assembly.

Referring to FIG. 4, the exit guide assembly 102 is shown in a front view with the vanes 128 extending radially outward from a center support hub 132 to an outer periphery 162. Each of the vanes 128 include a passage 130 that communicates captured water outward toward the periphery 162 and into the secondary water outlet 126. The swirling component of the incoming flow 122 may impart radial momentum on the liquid water communicated into the passage 130. Moreover, the passages 130 may be arranged to advantageously utilize engine orientation to generate any momentum required to drive recovered water through the secondary water outlet 126. The secondary water outlet 126 may be single annular passage, or a plurality of passages. Moreover, although the outlet 126 is shown communicating the secondary flow 108 as a single flow, the flows may be separate and communicated to different locations in the propulsion system 20.

Figure 5:
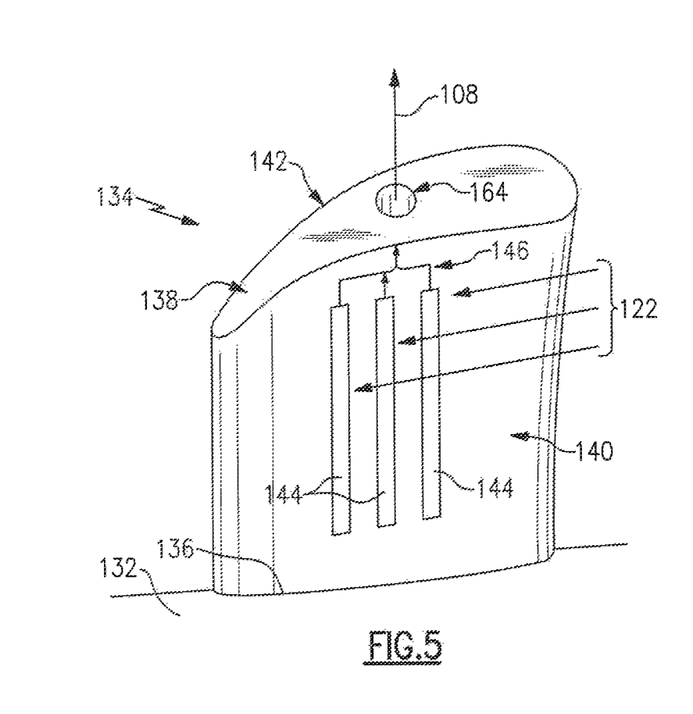
FIG. 5 is a schematic view of an example guide vane.

Referring to FIG. 5, an example vane 134 embodiment is shown and includes a root portion 136 adjacent the hub 132. The vane 134 includes a pressure side 140 and a suction side 142 that extend from the root 136 to a tip 138. A passage 146 is in fluid communication with a plurality of openings disposed on the pressure side 140. In one example embodiment, the openings are slots 144 that extend for some partial length between the tip 138 and the root 136. The passage 146 is shown schematically and may be one passage or a plurality of passages disposed internally within the vane 134 that communicate the secondary water flow 108 radially outward through an opening. In one example, the opening 164 is disposed at a radially outward facing surface at the tip 138. The opening 164 may be located elsewhere and remain within the contemplation and scope of this disclosure.

Figure 6:
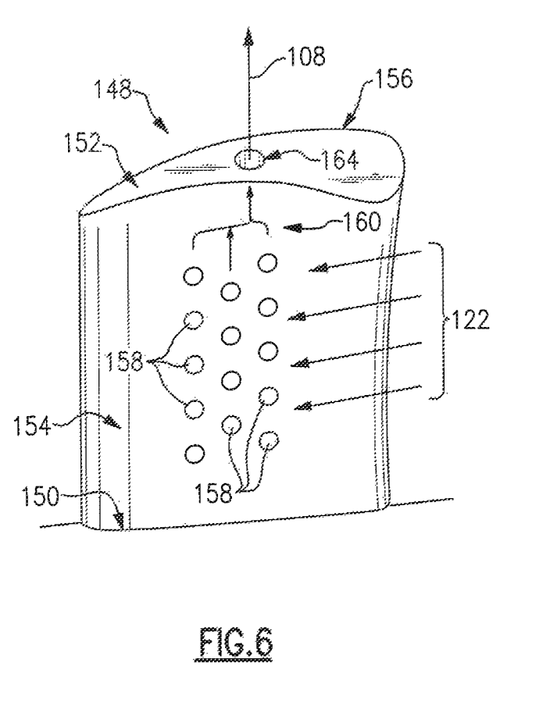
FIG. 6 is a schematic view of another example guide vane.

Referring to FIG. 6, another vane 148 embodiment is shown that includes a pressure side 154 and a suction side 156 that extends between a root 150 and tip 152. A plurality of holes 158 are disposed on the pressure side 154 and communicate water through a passage 160. The passage 160 is an internally located passage that communicates accumulated water to the opening 164. In one example embodiment, the opening 164 is disposed through a radially facing surface of the tip 152.

Figure 7:
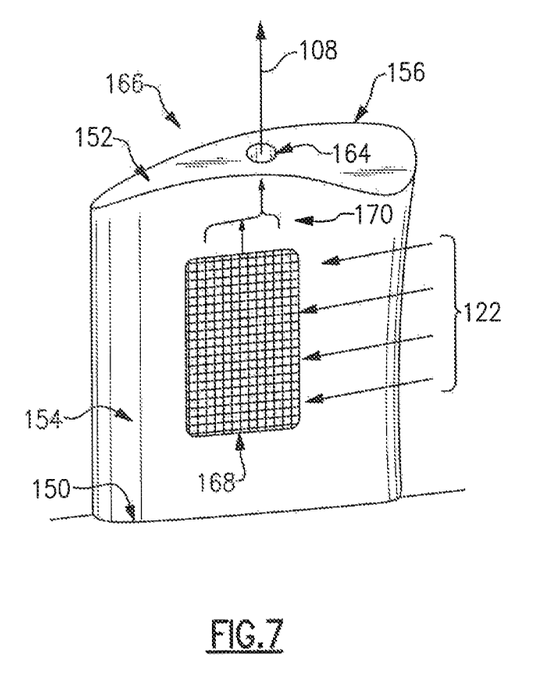
FIG. 7 is a schematic view of yet another example guide vane.

Referring to FIG. 7, another example vane 166 is shown that includes a pressure side 154 and a suction side 156 that extends between a root 150 and tip 152. A porous region 168 is provided on the pressure side 154 and communicates water through to a passage 170. The passage 170 is an internally located passage that communicates accumulated water to the opening 164. In one example embodiment, the opening 164 is disposed through a radially facing surface of the tip 152. The porous region 168 is shown in as part of the pressure side 154, but may be part of the suction side 156. Moreover, the porous region 168 may cover other surfaces of the vane 166. The porous region 168 may be formed from a metal foam material or any other porous material that facilitate water flow into the passage 170.

Although slots 144, holes 158 and a porous region 168 are shown and described by way of example, other opening shapes, sizes and quantities for catching liquid water during straightening of the flow 122 could be utilized and are within the contemplation and scope of this disclosure.

The example separator 100 provides for the separation of additional amounts of liquid water from a core flow without additional energy input, while straightening flow to generate additional propulsive thrust.

Although an example engine configuration is described by way of example, it will be appreciated that other engine configurations may include additional structures and features and are within the contemplation and scope of this disclosure.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising:
a core engine including a core flow path where air is compressed in a compressor section, communicated to a combustor section, mixed with a hydrogen based fuel and ignited to generate a core gas flow that is expanded through a turbine section;
a hydrogen fuel system configured to supply the hydrogen based fuel to the combustor section through a fuel flow path;
a condenser arranged along the core flow path and configured to condense water within the core gas flow; and
a water separator including an inlet, a primary water outlet and an exit including a plurality of exit guide vanes for straightening the core gas flow proceeding through the exit, wherein each one of the plurality of exit guide vanes include a secondary water outlet for removing condensed water in the core gas flow proceeding through the exit.

2. The propulsion system as recited in claim 1, wherein each of the plurality of exit guide vanes include a channel in communication with the secondary water outlet for routing the condensed water to a water reservoir.

3. The propulsion system as recited in claim 2, wherein each one of the plurality of exit guide vanes includes a root portion disposed proximate a central axis of the water separator and a tip portion disposed at a periphery of the water separator and the channel includes an outlet disposed proximate the periphery.

4. The propulsion system as recited in claim 2, including a water storage tank and the channel is configured to communicate water recovered through the primary water outlet and the secondary water outlet to the water storage tank.

5. The propulsion system as recited in claim 1, wherein the secondary water outlet comprises a plurality of openings.

6. The propulsion system as recited in claim 1, wherein the secondary water outlet comprises at least one slot.

7. The propulsion system as recited in claim 1, wherein the secondary water outlet comprises a porous region on a surface of at least one of the exit guide vanes.

8. The propulsion system as recited in claim 1, wherein each one of the plurality of exit guide vanes includes a pressure side and a suction side with the secondary water outlet disposed on the pressure side.

9. The propulsion system as recited in claim 1, including an evaporator arranged along the core flow path and configured to receive a portion of the water extracted by the condenser to generate a steam flow, wherein the steam flow is injected into the core flow path upstream of the turbine section.

10. A water recovery system comprising:
a separator including an inlet, a primary water outlet and an exit including a plurality of exit guide vanes for straightening a core flow proceeding through the exit, wherein each one of the plurality of exit guide vanes include a secondary water outlet for removing condensed water in the core flow proceeding through the exit.

11. The water recovery system as recited in claim 10, further including a condenser arranged to condense water present within the core flow.

12. The water recovery system as recited in claim 10, wherein each one of the plurality of exit guide vanes include a channel in communication with the secondary water outlet for routing the condensed water to a water reservoir.

13. The water recovery system as recited in claim 12, wherein each one of the plurality of exit guide vanes includes a root portion disposed proximate a central axis of the separator and a tip portion disposed at a periphery of the separator and the channel includes an outlet disposed proximate the periphery.

14. The water recovery system as recited in claim 10, wherein the secondary water outlet comprises a plurality of holes.

15. The water recovery system as recited in claim 10, wherein the secondary water outlet comprises at least one slot.

16. The water recovery system as recited in claim 10, wherein the secondary water outlet comprises a porous region on a surface of at least one exit guide vane.

17. The water recovery system as recited in claim 10, wherein each one of the plurality of exit guide vanes includes a pressure side and a suction side with the secondary water outlet is disposed on the pressure side.

18. A method of operating an aircraft propulsion system comprising:
generating a core gas flow that includes water;
condensing the water within the core gas flow into a liquid water in a condenser;
separating the liquid water from the core gas flow by inducing a circumferential flow through a circular housing to expel the liquid water through a primary water outlet;
straightening the core gas flow through an exit guide vane assembly; and
separating liquid water from the core gas flow through a secondary water outlet disposed within at least some guide vanes of the exit guide vane assembly.

19. The method as recited in claim 18, wherein the secondary water outlet comprises openings on a pressure side of the guide vanes and further comprising directing the core gas flow against the pressure side of the guide vanes.

20. The method as recited in claim 18, further comprising generating a propulsive thrust with the core gas flow proceeding through the exit guide vane assembly.

* * * * *